United States Patent [19]

Galle

[11] Patent Number: 5,570,911
[45] Date of Patent: Nov. 5, 1996

[54] ALIGNMENT SYSTEM FOR HUB CONNECTOR

[75] Inventor: Gary L. Galle, Houston, Tex.

[73] Assignee: ABB Vetco Gray Inc., Houston, Tex.

[21] Appl. No.: 419,346

[22] Filed: Apr. 10, 1995

[51] Int. Cl.⁶ ........................................ F16L 17/06
[52] U.S. Cl. .......................... 285/364; 285/24; 285/379; 285/917
[58] Field of Search .................... 285/379, 380, 285/917, 364, 24, 332, 231

[56] References Cited

U.S. PATENT DOCUMENTS

| | | |
|---|---|---|
| 1,178,714 | 4/1916 | Griffin . |
| 1,715,854 | 3/1923 | McKenzie-Martyn . |
| 1,906,826 | 7/1930 | Smith et al. . |
| 3,321,217 | 5/1967 | Ahlstone ........................ 285/379 |
| 3,345,085 | 10/1967 | Hanes ............................ 285/374 |
| 3,628,812 | 12/1971 | Larraled et al. . |
| 4,120,520 | 10/1978 | Ahlstone . |
| 4,272,109 | 6/1981 | Ahlstone ........................ 285/379 |
| 4,294,477 | 12/1981 | Ahlstone ........................ 285/379 |
| 4,428,603 | 1/1984 | Davlin . |
| 4,522,536 | 6/1985 | Vidrine . |
| 4,693,497 | 9/1987 | Pettus et al. ................... 285/320 |
| 4,861,077 | 8/1989 | Welkey . |
| 4,893,842 | 1/1990 | Brammer ........................ 285/24 |
| 4,903,992 | 2/1990 | Jennings et al. ................ 285/24 |
| 4,903,993 | 2/1990 | Brammer ........................ 285/24 |
| 5,279,369 | 1/1994 | Brammer ........................ 285/24 |
| 5,370,153 | 12/1994 | Galle ............................ 285/331 |

FOREIGN PATENT DOCUMENTS

| | | |
|---|---|---|
| 888143 | 1/1962 | United Kingdom . |
| 1030936 | 5/1966 | United Kingdom . |

*Primary Examiner*—Eric K. Nicholson
*Attorney, Agent, or Firm*—James E. Bradley

[57] ABSTRACT

A connector for connecting two pipes into abutment with each other uses mateable hub members with external flanges. One of the hub members has a concentric recess with a gross tapered surface and a fine tapered surface. The gross tapered surface is inclined at a greater angle relative to the axis than the fine tapered surface. The other hub member has a protruding guide member which will contact the gross and fine tapered surfaces when the hub members are brought together. First the gross tapered surface will decrease misalignment, then the fine tapered surface will complete the alignment of the hub members. A seal is located on seal seats in the hub members. The seal is metal and is carried in a position prior to connection so as to avoid damaging contact of the other hub member when the hub members are brought together.

18 Claims, 4 Drawing Sheets

ALIGNMENT SYSTEM FOR HUB CONNECTOR

BACKGROUND OF THE INVENTION

1. Field of the Invention

This invention relates in general to connectors for connecting two pipes together in abutment, and in particular to an alignment means for aligning the hubs of the pipes as they are brought together.

2. Description of the Prior Art

A pipe connector of the type concerned herein has two mateable hub members. Each hub member is integrally secured to an end of one of the pipes. Each of the hub members has an external flange, a bore, and a conical seal seat in the bore. A metal seal locates on the seal seat to seal the two hubs once connected. An external clamp engages the flanges to maintain the hubs connected to each other.

While making up the connection, the hub members must be angularly and axially aligned with each other. In some applications, particularly in subsea environments, alignment is not as easy. The pipe handling equipment can normally make an approximate alignment, however, perfect alignment prior to joining the hubs is difficult to achieve. If misaligned, the hub of one of the pipes may accidentally contact the metal seal, damaging it.

Some pipe handling equipment utilize external funnels or other external alignment devices to axially and angularly align the hub members as they are brought together. While workable, in other applications, it would be preferable to eliminate external alignment devices to provide improved access to the mouth of the connector, the face of the non-movable hub, and the seal.

SUMMARY OF THE INVENTION

In this invention, the hub members have an integral system for aligning the hubs when they are brought together. One hub member has a recess on its end which has a gross tapered surface and a fine tapered surface. The gross tapered surface is at a larger angle relative to the longitudinal axis than the fine tapered surface. The second hub member has a protruding guide member with mating gross and fine tapered surfaces and which locate within the recess. When the hub members are brought together while misaligned, first the guide member contacts the gross tapered surface to decrease axial misalignment. Then the guide member contacts and slides along the fine tapered surface to completely the align the hub members during final make-up.

A metal seal is carried by a seal carrier in one of the hub members in a pre-connection position that avoids damage during normal make-up. In this pre-connection position, the seal is sufficiently recessed to avoid being struck by the other hub member in a damaging manner during make-up.

DETAILED DESCRIPTION OF THE INVENTION

Figure 1:
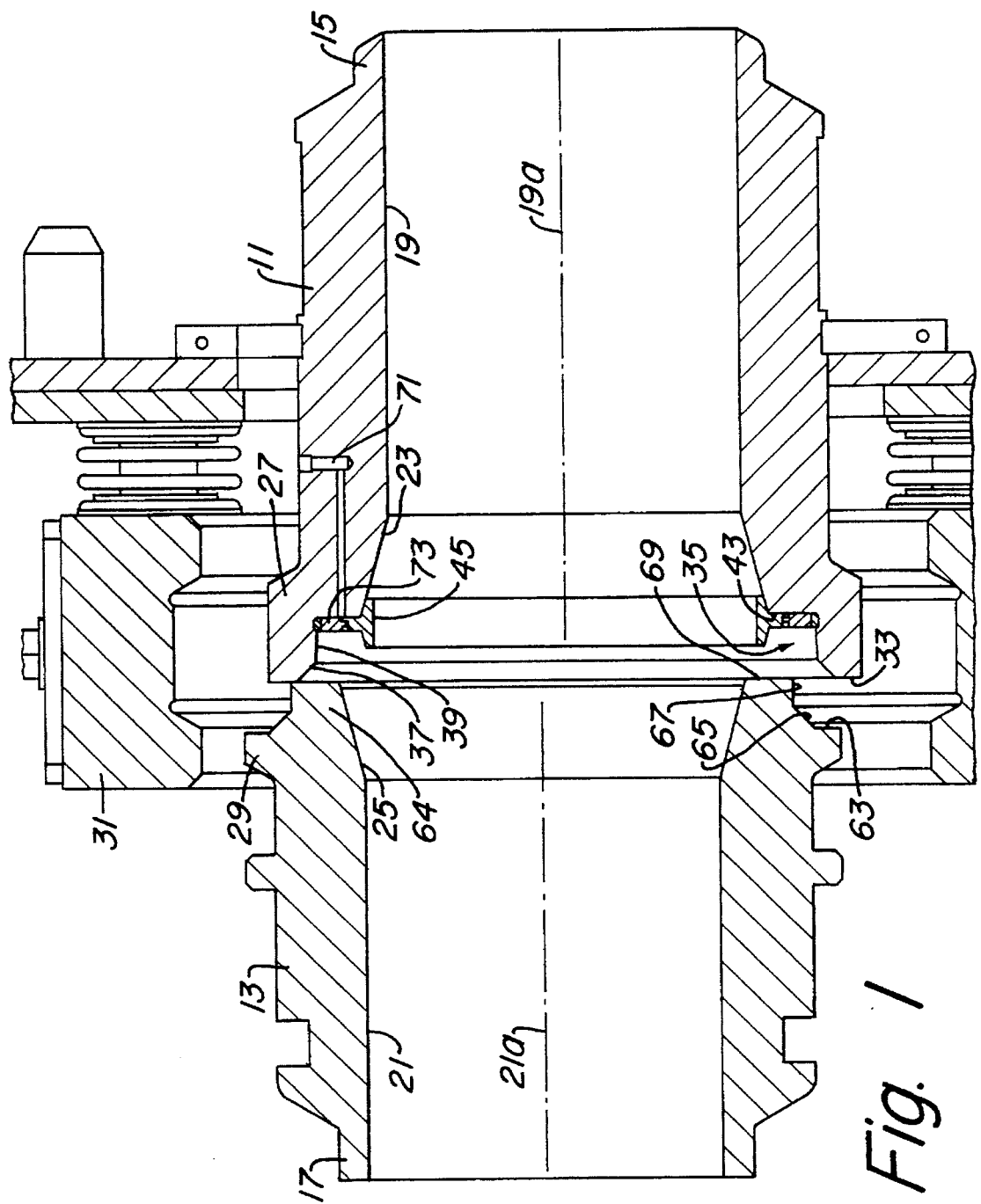
FIG. 1 is a vertical cross sectional view of a pipe connector constructed in accordance with this invention, showing the two hub members prior to make-up and showing them in a misaligned position.

Referring to FIG. 1, the connector of this invention has a female hub member 11 which mates with a male hub member 13. Each hub member 11, 13 is joined respectively to a pipe 15, 17. Hub members 11, 13 have bores 19, 21, which have longitudinal axes 19a, 21a which coincide once connected. Each bore 19, 21 has a conical seal seat 23, 25 located therein. Each hub member 11, 13 has an external flange 27, 29 which is engaged by a segmented clamp 31 to hold the hub members 11, 13 connected together.

Figure 2:
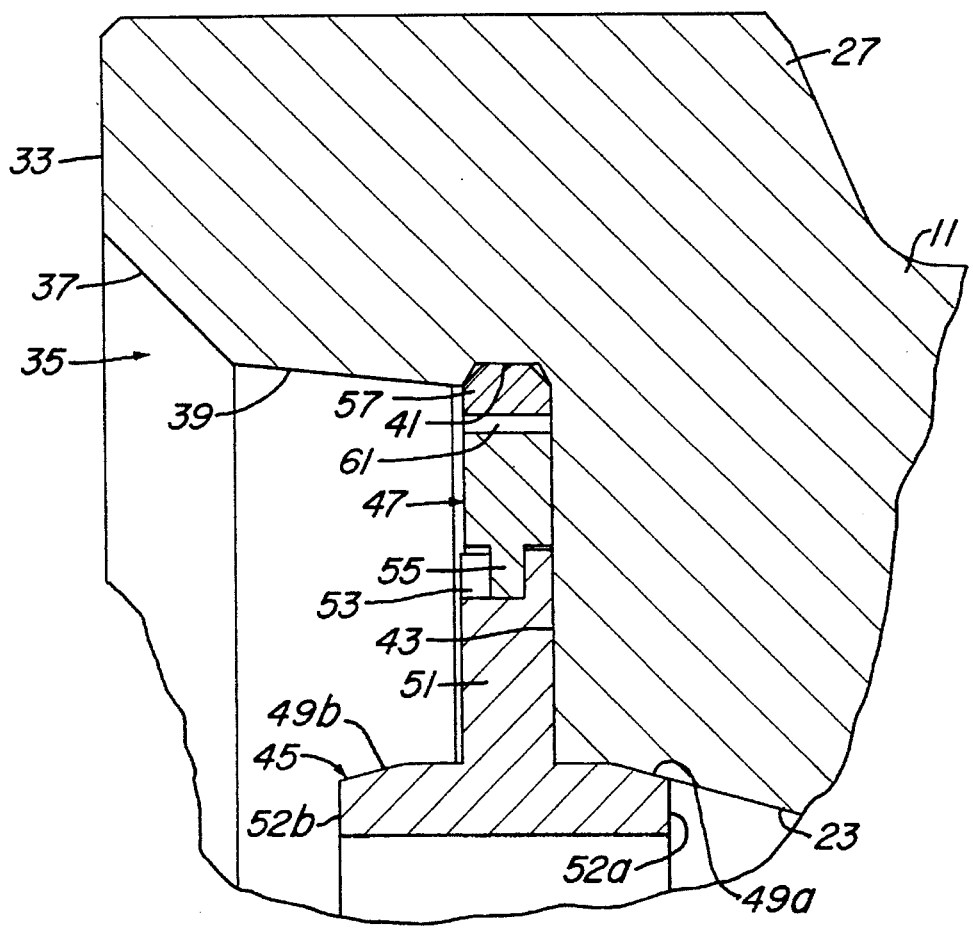
FIG. 2 is a partial and larger sectional view of a portion of the female hub member of FIG. 1.

Referring to FIG. 2, female hub member 11 has an outer circular face 33 on the forward side of external flange 27 that is perpendicular to the longitudinal axis. Outer face 33 extends from the edge of flange 27 radially inward to a recess 35. Recess 35 includes a gross conical surface 37. Gross conical surface 37 extends from outer face 33 rearward, with "rearward" used herein to mean the axial direction into the hub member 11. Gross conical surface 37 is at an angle of about 45–60 degrees relative to longitudinal axis 19a, preferably 45 degrees.

A fine conical surface 39 joins the rearward edge of gross conical surface 37 and extends further rearward. Fine conical surface 37 is inclined at a lesser angle than gross conical surface 37 relative to longitudinal axis 19a. The angle is less than or equal to the angle of the seal seat 23, which is normally in the range of 10–20 degrees. In the embodiment shown, the angle of seat 23 is about 15 degrees and the angle of fine conical surface 39 is about five degrees relative to longitudinal axis 19a. A cylindrical counterbore 41 is located at the rearward edge of fine conical surface 39. Counterbore 41 joins an inner face 43. Inner face 43 is parallel to outer face 33 and extends to seal seat 23.

A conventional seal 45 is carried on seal seat 23. Seal 45 is a rigid metal ring held in place by a retainer 47. Seal 45 has two seal surfaces 49a and 49b on its outer diameter, which are conical surfaces tapered at the same angle as seal seats 23, 25 (FIG. 1). The seal surfaces 49a, 49b sealingly engage the seal seats 23, 25, respectively. A circular flange or rib 51 extends radially outward from the outer diameter of seal 49. Rib 51 is located halfway between a rearward edge 52a and a forward edge 52b of seal 45 and at the junction between two seal surfaces 49a, 49b. Rib 51 has several slots 53 (only one shown) spaced circumferentially apart from each other on its outer diameter. Each slot 53 has an open forward side and a closed rearward side.

Figure 3:
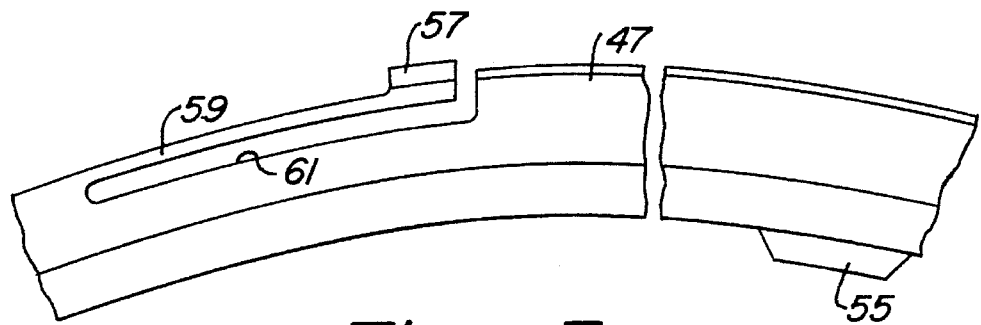
FIG. 3 is a partial elevational view of the seal retainer shown in FIG. 2.

Retainer 47 is a solid metal ring with a several inner tabs 55 (only one shown), on its inner diameter, each of which locates in one of the slots 53 to retain seal 45 in a pre-connection position as shown in FIG. 2. As shown in FIG. 3, several outer tabs 57 (only one shown) serve as means for holding retainer 47 with hub member 11. Outer tabs 57 are also spaced apart circumferentially from each other. Each outer tab 57 extends outward past the solid body of retainer 47 and is cantilevered to the body of retainer 47 by a flexible leg 59. Leg 59 is separated from the body of retainer 47 by clearance 61. The outer diameter circumscribed by the outer tabs 57 is greater than the inner diameter of the rearward edge of fine conical surface 39 and also slightly greater than the inner diameter of counterbore 41. During insertion of retainer 47 and seal 45 into recess 35, each outer tab 57 flexes into its clearance 61 slightly to create a radial force against counterbore 41 to frictionally hold retainer 47 and seal 45 in position.

When in the pre-connection position, seal 45 is fully recessed within recess 35. The forward edge 52b of seal 45 will be recessed rearward a significant distance from the junction between fine conical surface 39 with gross conical surface 37. The lengths and angles of gross conical surface 37 and fine conical surface 39 are selected to position seal 45 so as to avoid damaging contact from male hub member 13 during make-up, even if misaligned, as long as the misalignment is within operational tolerances. The pipe handling equipment is operated remotely in a subsea environment. Consequently, while it will achieve approximate alignment, it has an operational envelope of misalignment. In one example, while in the initial contacting position shown in FIG. 1, the angular alignment may be up to 1.4 degrees, and the axial misalignment between axes 19a, 21a may be 0.555 inch. Within the envelope of misalignment, it is not possible for hub member 13 to damage seal 45.

A preferred seal 45 for a twelve inch bore 19 has an axial length from rearward edge 52a to forward edge 52b of 1⅜ inch. This results in the forward edge 52b being recessed about 5/16 inch from the junction of fine conical surface 39 with gross conical surface 37. The axial length of fine conical surface 39 is about one inch, measured from the forward edge of counterbore 41 to gross tapered surface 37. The axial length of gross conical surface 39 to outer face 33 is about one-half inch.

Referring again to FIG. 1, male hub member 13 has an outer face 63 which is perpendicular to longitudinal axis 21a and located on the forward side of external flange 29. A guide member 64 protrudes forward from outer face 63 for mating reception in female hub member recess 35. Guide member 64 has a gross conical surface 65 which extends forward from outer face 63. Gross conical surface 65 is at the same angle relative to longitudinal axis 21a as gross conical surface 37 of female hub member 11 is to longitudinal axis 19a. Guide member 64 has a fine conical surface 67 which joins the forward edge of gross conical surface 65 and extends forward. Fine conical surface 67 is at the same angle as fine conical surface 39 of female hub member 11. The forward end of guide member 64 terminates with an inner face 69, which joins the forward edge of fine conical surface 67 and extends to seal seat 25. Inner face 69 is circular and parallel with outer face 63.

In the embodiment shown in FIG. 1, a test passage 71 extends through female member 11 to seal 45 for applying test pressure to test seal 45. An elastomeric seal 73 is located on retainer 47 and rib 51. Seal 73 forms a seal between inner faces 43, 69 during make-up. Once made up, test pressure can be applied to test passage 71 to test whether seal surfaces 49a, 49b have properly sealed against seal seats 23, 25.

In operation, FIG. 1 shows the hub members 11, 13 being brought together for connection. In the embodiment shown, female hub member 11 is mounted rigidly to a portion of the clamp 31, while additional pipe handling equipment (not shown) will move male hub member 13 toward female hub member 11. In the example shown in FIG. 1, female hub member 11 is both out of alignment axially as well angularly.

Figure 4:
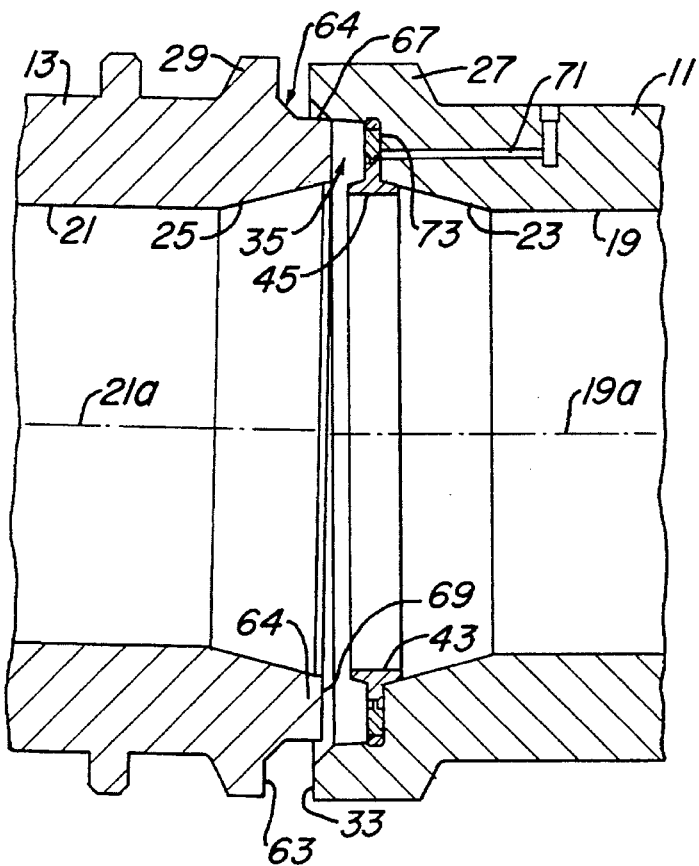
FIG. 4 is a partial sectional view of the two hub members of FIG. 1, shown closer to final make-up than in FIG. 1, but still partially misaligned.

If misaligned as shown in FIG. 1, initially, the corner of guide member 64, between seal seat 25 and inner face 69, will contact gross conical surface 37 of female hub member 11. The forward edge 52b of seal 45 is recessed sufficiently so that it cannot be touched by guide member 64 while guide member 64 is still in engagement with the gross conical surface 37. As guide member 64 moves forward from the initial contact to the rearward edge of gross conical surface 37, the gross conical surface 37 forces male hub member 13 into substantial axial alignment as shown in FIG. 4. While at the point shown in FIG. 4, axis 21a will intersect axis 19a at the forward end of guide member 64. Gross conical surface 37, however, does not substantially decrease any angular misalignment, and axis 21a will still be at a small angle relative to axis 19a. Guide member 64 will still be forward of the forward edge 52b of seal 45, because guide member 64 is still in contact with gross conical surface 65.

Figure 5:
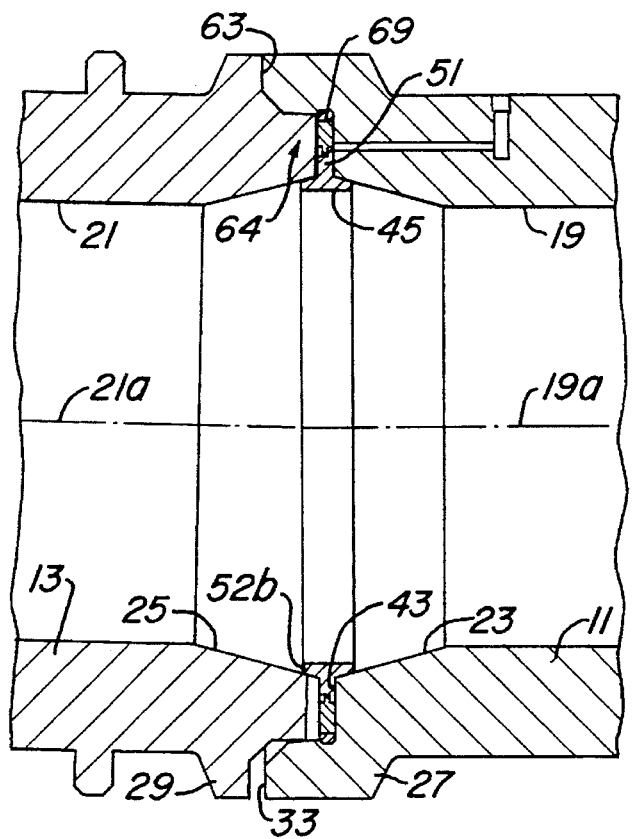
FIG. 5 is a partial sectional view of the two hub members of FIG. 1, shown closer to final make-up than in FIG. 4, but still partially misaligned.

Continued make-up movement of male hub member 13 causes the fine conical surface 67 of guide member 64 to engage the fine conical surface 39 of female hub member 11, decreasing the angular misalignment. As shown in FIG. 5, by the time guide member 64 reaches seal forward edge 52b, sufficient alignment has occurred so as to move the forward edge of seal seat 25 into initial contact with sealing surface 49b. The dimensions of the components prevent the guide member inner face 69 from striking the seal forward edge 52b. Some angular misalignment still exists, however, all of the axial alignment has been removed and a portion of the angular misalignment. Also, at the point shown in FIG. 5, a portion of each inner face 43, 69 is contacting a portion of the seal rib 51. A gap remains at another portion between male inner face 69 and the forward facing side of rib 51.

Figure 6:
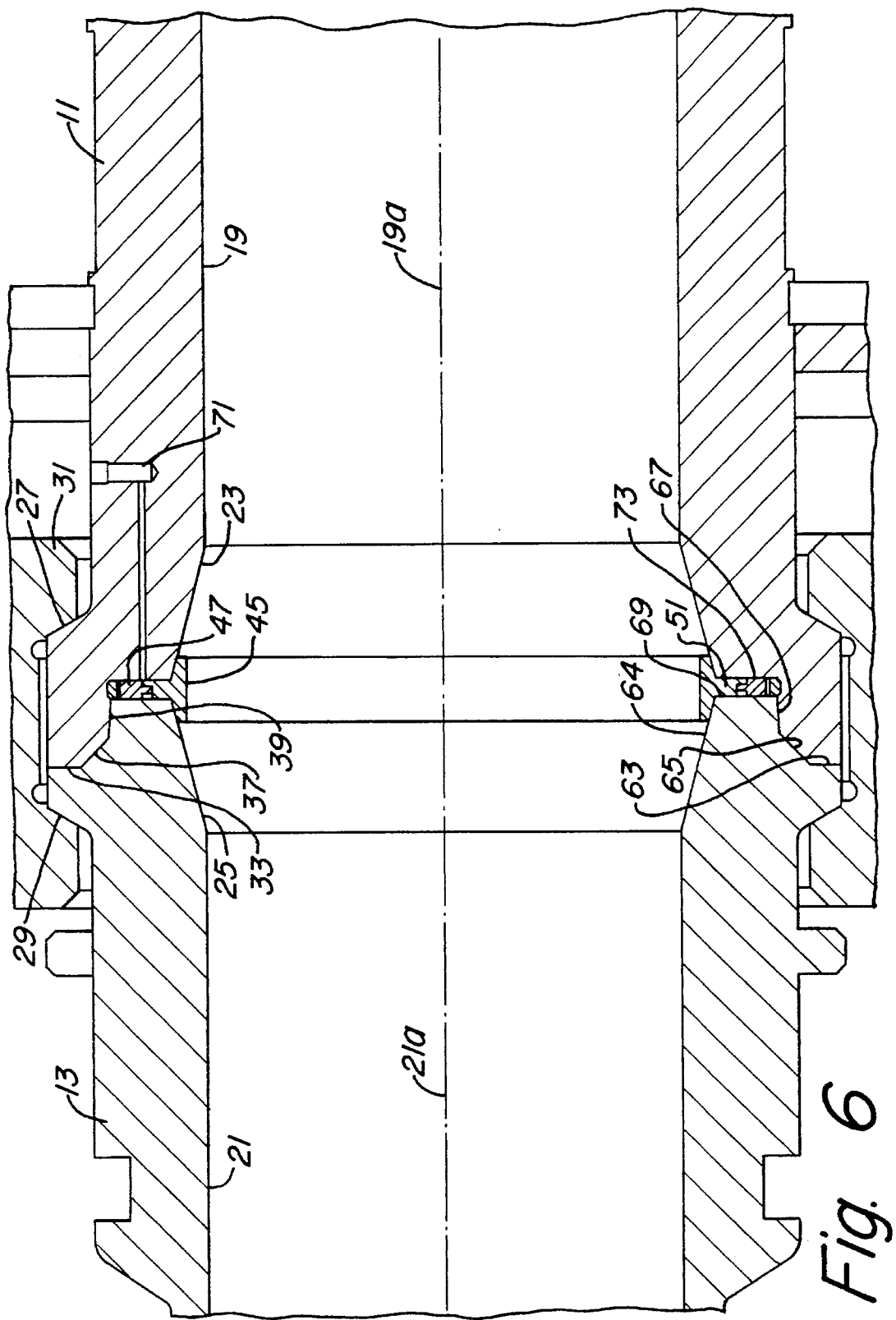
FIG. 6 is a sectional view of the connector in FIG. 1, shown fully made-up.

Continued further make-up movement causes the fine conical surfaces 39, 67 to completely angularly align the hub members 11, 13 as shown in FIG. 6. Once substantially made up, the operator moves the clamp segments 31 radially inward to engage the inclined faces on the external flanges 27, 29. This brings the hub members 11, 13 tightly into contact with each other. Seal 45 will be sealing against the seal seats 23, 25. The inner faces 43, 69 will be sealing against the elastomeric seal 73 on opposite sides of seal rib 51. The outer faces 33, 63 will be in substantial abutment with each other, although a slight clearance exists.

The invention has significant advantages. The combination of the gross alignment and the fine alignment surfaces provides automatic compliance of the two hub members without the need for an external funnel or other external guiding device. The integral alignment system, as well as the positioning of the seal, eliminates the possibility of damaging contact of the seal with the other hub member. The retainer for the seal is simple and effective, requiring no external holder nor fasteners.

While the invention has been shown in only one of its forms, it should be apparent to those skilled in the art that it is not so limited, but is susceptible to various changes without departing from the scope of the invention.

I claim:

1. In a connector for releasably connecting together two pipes into abutment with each other, wherein the pipes have mateable first and second hub members, each of the hub members having a bore with a longitudinal axis and a seal seat for engagement with a seal surface on an outer diameter portion of a metal seal, the improvement comprising:

the first hub member having on an end a concentric recess encircled by a face which is perpendicular to the longitudinal axis, the first member having a gross tapered surface intersecting the face, extending into the recess and being formed at an angle relative to the longitudinal axis, the first hub member having a fine tapered surface formed at a smaller angle relative to the longitudinal axis than the angle of the gross tapered surface, the fine tapered surface intersecting the gross tapered surface and extending farther into the recess;

the second hub member having a protruding guide member having an end and an external fine tapered surface that intersects and extends away from the end at the same angle relative to the longitudinal axis of the second hub member as the angle of the fine tapered surface of the first hub member, the external fine tapered surface first contacting the gross tapered surface of the first hub member to decrease misalignment when the hub members are brought together while misaligned, then mating with the fine tapered surface of the first hub member to complete alignment of the hub members; and a seal carrier for carrying the seal with one of the hub members in a pre-connection position wherein the seal surface is in engagement with one of the seal seats, the pre-connection position and the lengths and angles of the tapered surfaces being selected to prevent contact of any portion of the other of the hub members with the seal until the external fine tapered surface of the guide member is in engagement with the fine tapered surface of the first hub member.

2. The connector according to claim 1, wherein the seal carrier carries the seal within the recess.

3. The connector according to claim 1, wherein the guide member has an external gross tapered surface that intersects the external fine tapered surface and extends from the external fine tapered surface at the same angle relative to the longitudinal axis of the second hub member as the angle of the gross tapered surface of the first hub member for mating with the gross tapered surface of the first hub member when the hub members are connected together.

4. The connector according to claim 1, wherein the seal has a forward edge, and while in the pre-connection position the forward edge is recessed from the end of the hub member which carries the seal.

5. The connector according to claim 1, wherein the gross and fine tapered surfaces are conical.

6. In a connector for releasably connecting together two pipes into abutment with each other, wherein the pipes have mateable first and second hub members, each of the hub members having a bore with a longitudinal axis and a conical seal seat for engagement with a seal surface on an outer diameter portion of a metal seal, the improvement comprising:

the first hub member having on an end an outer face surrounding a concentric recess which has a gross tapered surface intersecting the outer face and extending into the recess, the gross tapered surface being formed at an angle relative to the longitudinal axis, the first hub member having a fine tapered surface intersecting and extending from the gross tapered surface away from the outer face farther into the recess, the fine tapered surface being formed at a smaller angle relative to the longitudinal axis than the angle of the gross tapered surface;

the second hub member having an outer face surrounding a guide member, the guide member having a gross tapered surface extending forward from the outer face which is at the same angle as the gross tapered surface of the first hub member for mating with the gross tapered surface of the first hub member and a fine tapered surface which intersects and extends forward from the gross tapered surface at the same angle as the fine tapered surface of the first hub member for mating with the fine tapered surface of the first hub member; and seal carrying means for carrying the seal within the recess in a pre-connection position wherein the seal surface is in engagement with the seal seat of the first hub member and a forward edge of the seal is recessed rearward from the outer face of the first hub member.

7. The connector according to claim 6, wherein:

the fine tapered surface of the first hub member is at an angle relative to the longitudinal axis of the first hub member which is less than the angle of the seal seat relative to the longitudinal axis of the first hub member.

8. The connector according to claim 6, wherein:

in the pre-connection position, the forward edge of the seal is recessed rearward of the junction between the gross tapered surface and the fine tapered surface of the first hub member.

9. The connector according to claim 6, wherein the seal carrying means comprises:

a retainer which is located between the seal and a portion of the recess.

10. The connector according to claim 6, wherein the seal carrying means comprises:

a retaining ring which has an inner diameter portion that engages the seal and an outer diameter portion that engages a portion of the recess, the retaining ring having bias means for applying a radial force for frictionally retaining the retainer and the seal within the recess.

11. A connector for releasably connecting together two pipes into abutment with each other, comprising in combination:

first and second hub members on ends of the pipes, each having a bore with a longitudinal axis, a tapered seal seat, and a circular inner face encircling the seal seat, the inner face of each of the hub members being perpendicular to the longitudinal axis;

an external flange on each of the hub members, having a circular outer face;

the first hub member having a concentric recess which is encircled by the outer face of the first hub member, the recess having a gross conical surface which joins and extends rearward from the outer face of the first hub member at an angle relative to the longitudinal axis, the recess having a fine conical surface joining and extending rearward from the gross conical surface toward the inner face of the first hub member, the fine conical surface being formed at a smaller angle relative to the longitudinal axis than the angle of the gross conical surface;

the second hub member having a protruding guide member which is encircled by the outer face of the second hub member, the guide member having a gross conical surface extending forward from the outer face of the second hub member which is at the same angle as the gross conical surface of the recess, the guide member having a fine conical surface which extends forward from the gross conical surface of the guide member, which joins the inner face of the second hub member and is at the same angle as the fine conical surface of the recess;

a metal seal having a first seal surface on an outer diameter portion which engages the seal seat of the first hub member and a second seal surface on an outer diameter portion which engages the seal seat of the second hub member, the seal ring having a rib which extends radially outward from the seal ring at a junction of the first and second seal surfaces;

seal carrying means for carrying the seal within the recess in a pre-connection position with the first seal surface in engagement with the seal seat of the first hub member, the rib in abutment with the inner face of the first hub member, and with a forward edge of the seal recessed rearward of the gross conical surface of the first hub member, so that when the hub members are brought together when misaligned within a selected tolerance, the guide member will first engage the gross conical surface of the recess to decrease misalignment, then engage the fine conical surface of the recess to complete alignment without contact of the guide member with the seal until the guide member is engaging the fine conical surface; and a clamp for engaging the external flanges to secure the hub members in mating engagement with each other, with the rib located between the inner faces and with the outer faces in abutment with each other.

12. The connector according to claim 11, wherein the seal carrier comprises:

a retaining ring which has an inner diameter portion that engages the seal and an outer diameter portion that engages the recess at a junction with the inner face of the first hub member, the retaining ring having bias means for applying a radial force for frictionally retaining the retainer and the seal within the recess.

13. The connector according to claim 11, wherein the seal carrier comprises:

a retaining ring which has an inner diameter portion that engages the seal and an outer diameter portion that engages the recess at a junction with the inner face of the first hub member, the retaining ring having at least one spring-biased tab on its outer diameter portion which applies a radial force against the recess for frictionally retaining the retainer and the seal within the recess.

14. The connector according to claim 11, wherein the fine conical surface of the first hub member is at an angle relative to the longitudinal axis of the first hub member which is no greater than the angle of the seal seat relative to the longitudinal axis of the first hub member.

15. The connector according to claim 11, wherein:

the seal seat is at an angle relative to the longitudinal axis of the first hub member that is in the range from 10–20 degrees;

the gross conical surface of the first hub member is at an angle in the range from 45–60 degrees relative to the longitudinal axis of the first hub member; and the fine conical surface of the first hub member is at an angle relative to the longitudinal axis of the first hub member which is no greater than the angle of the seal seat relative to the longitudinal axis of the first hub member.

16. A method for releasably connecting together two pipes into abutment with each other, wherein the pipes have mateable first and second hub members, each of the hub members having a bore with a longitudinal axis and a seal seat for engagement with a seal surface on outer diameter portion of a metal seal, the method comprising:

providing the first hub member with a face encircling a concentric recess, a gross tapered surface formed at an angle relative to the longitudinal axis and extending from the face into the recess, a fine tapered surface formed at a smaller angle relative to the longitudinal axis than the angle of the gross tapered surface, intersecting the gross tapered surface and extending farther into the recess;

providing the second hub member with a protruding guide member which has an end, a fine tapered surface extending from the end which is at the same angle as the angle of the fine tapered surface of the first hub member;

carrying the seal being with one of the hub members in a pre-connection position with the seal surface in engagement with one of the seal seats;

moving the hub members nonrotationally toward each other to position the guide member within the recess and the seal in engagement with the both of the seal seats; and if the hub members are misaligned prior to reception of the guide member within the recess, first engaging the gross tapered surface of the first hub member with the fine tapered surface of the guide member to decrease misalignment, then engaging the fine tapered surface of the first hub member with the fine tapered surface of the guide member to complete alignment of the hub members; and preventing contact of any portion of the guide member with the seal until the fine tapered surface of the guide member is in engagement with the fine tapered surface of the first hub member.

17. The method according to claim 16 wherein the step of carrying the seal in the pre-connection position comprises:

retaining the seal such that a forward edge of the seal is recessed rearward from an end of the hub member which carries the seal in the pre-connection position.

18. The method according to claim 16 wherein the step of carrying the seal in the pre-connection position comprises:

retaining the seal in the recess such that a forward edge of the seal is recessed rearward from the gross tapered surface.

\* \* \* \* \*